US006580985B2

(12) United States Patent
Totani et al.

(10) Patent No.: US 6,580,985 B2
(45) Date of Patent: Jun. 17, 2003

(54) VEHICLE AUDIO ADAPTER

(75) Inventors: Tsutomu Totani, Nagoya (JP); Yasuo Serikawa, Nagoya (JP)

(73) Assignee: Beat-Sonic Co., Ltd., Aichi (JP)

( * ) Notice: Subject to any disclaimer, the term of this patent is extended or adjusted under 35 U.S.C. 154(b) by 0 days.

(21) Appl. No.: 10/072,050

(22) Filed: Feb. 8, 2002

(65) Prior Publication Data

US 2002/0152011 A1 Oct. 17, 2002

(30) Foreign Application Priority Data

Apr. 17, 2001 (JP) ....................................... 2001-117944

(51) Int. Cl.[7] ................................................. G06F 7/00
(52) U.S. Cl. ............................ 701/36; 701/49; 370/908
(58) Field of Search ............................... 701/1, 36, 49; 455/575; 370/245, 908

(56) References Cited

U.S. PATENT DOCUMENTS 5,289,378 A * 2/1994 Miller et al. .................. 701/35
5,465,207 A * 11/1995 Boatwright et al. .......... 701/52
5,625,555 A * 4/1997 Davis ............................ 701/1
5,928,292 A * 7/1999 Miller et al. .................. 701/36

* cited by examiner

*Primary Examiner*—Gertrude Arthur
(74) *Attorney, Agent, or Firm*—Koda & Androlia

(57) ABSTRACT

A vehicle audio adapter which is used in a vehicle multivision system in which electronic apparatuses including an audio, television, car navigation, air condition control, picture monitor and switch panel are connected by a LAN cable to be constructed into a room LAN so that the electronic apparatuses are intensively controlled by a single monitor. When a predetermined one of the electronic apparatuses connected by the room LAN cable is replaced with a non-genuine apparatus which cannot be connected by the room LAN cable and is unsuitable for the room LAN, functions of the room LAN are maintained with the genuine apparatus being left and the genuine apparatus is replaceable with the non-genuine apparatus.

12 Claims, 2 Drawing Sheets

VEHICLE AUDIO ADAPTER

BACKGROUND OF THE INVENTION

1. Field of the Invention

This invention relates to a vehicle audio adapter for switching between a genuine head unit and a commercially available non-genuine head unit in an electromultivision system provided in a vehicle.

2. Description of the Related Art

An electromultivision is a system including a color multidisplay capable of displaying navigation screens, vehicle information such as time of maintenance, an operating state of air conditioner, an operating state of audio equipment, and a TV screen when a vehicle is idling. When a touch panel on the display is touched or when nearby switches are operated, the operating state of each above-mentioned apparatus is set or switched. The above-mentioned apparatuses include respective microcomputers and are connected into a network so that a room LAN is constructed.

In the foregoing system, even when the audio equipment or navigation system is replaced with a commercially available non-genuine equipment without communicating function adapted to the room LAN, the consistency of the system is lost. As a result, since the other apparatuses in the LAN are turned off, the audio equipment or navigation system cannot be replaced with the commercially available equipment.

SUMMARY OF THE INVENTION

Therefore, an object of the present invention is to provide an audio adapter which can be used when the genuine head unit is replaced with a commercially available non-genuine head unit or the adapter is switched between the genuine head unit and the non-genuine head unit in uses and which can simplify the work for replacing the genuine head unit with the non-genuine one or for adding the non-genuine head unit.

To achieve the object, the present invention provides a vehicle audio adapter which is used in a vehicle multivision system in which electronic apparatuses including an audio, television, car navigation, air condition control, picture monitor and switch panel are connected by a LAN cable thereby to be constructed into a room LAN so that the electronic apparatuses are intensively controlled by a single monitor. In the vehicle audio adapter, when a predetermined one of the electronic apparatuses connected by the LAN cable is replaced with a non-genuine apparatus which cannot be connected by the LAN cable and is unsuitable for the room LAN, functions of the room LAN are maintained with the genuine apparatus being left and the genuine apparatus is replaceable with the non-genuine apparatus.

According to the above-described adapter, when a predetermined one of the electronic apparatuses connected by the LAN cable is replaced with a non-genuine apparatus which cannot be connected by the LAN cable and is unsuitable for the room LAN, functions of the room LAN are maintained with the genuine apparatus being left and the genuine apparatus is replaceable with the non-genuine apparatus.

In a first preferred form, an apparatus necessary for the room LAN is moved from one position to another in the vehicle and which further comprises a fitting for mounting the non-genuine apparatus instead of the moved room LAN. The non-genuine apparatus is installed by a fitting at a position where an apparatus necessary for the room LAN has been moved to another position.

In a second preferred form, the non-genuine apparatus added at another position in the interior of the vehicle can be replaced without moving an apparatus necessary for the room LAN. The non-genuine apparatus added to another position in the interior of the vehicle can be switched without moving an apparatus necessary for the room LAN.

In a third preferred form, the vehicle audio adapter further comprises a signal wire provided for connecting a LAN cable or extension cable required for moving the apparatus necessary for the room LAN. The signal wire connects the adapter to a middle of the LAN cable or extension cable provided for moving the apparatus necessary for the room LAN.

In a fourth preferred form, a sound signal circuit is connected only when the non-genuine apparatus is turned on, using an external amplifier remote signal changing to 12 V when the non-genuine apparatus is turned on and to 0 V when the non-genuine apparatus is turned off.

In a fifth preferred form, the adapter further comprises a double-throw switch with a plurality of poles or relay switch for switching the audio signal circuit between the genuine audio apparatus and a non-genuine audio apparatus.

In a sixth preferred form, another location in the vehicle to which an apparatus required for the room LAN is moved includes an interior of a glove box, a space under a seat, an interior of a trunk, a luggage space and the like. In this case, the adapter further comprises fittings for fixing the apparatus at said another location.

BRIEF DESCRIPTION OF THE DRAWINGS

Other objects, features and advantages of the present invention will become clear upon reviewing the following description of an embodiment, made with reference to the accompanying drawings, in which.

DETAILED DESCRIPTION OF AN EMBODIMENT

Figure 1:
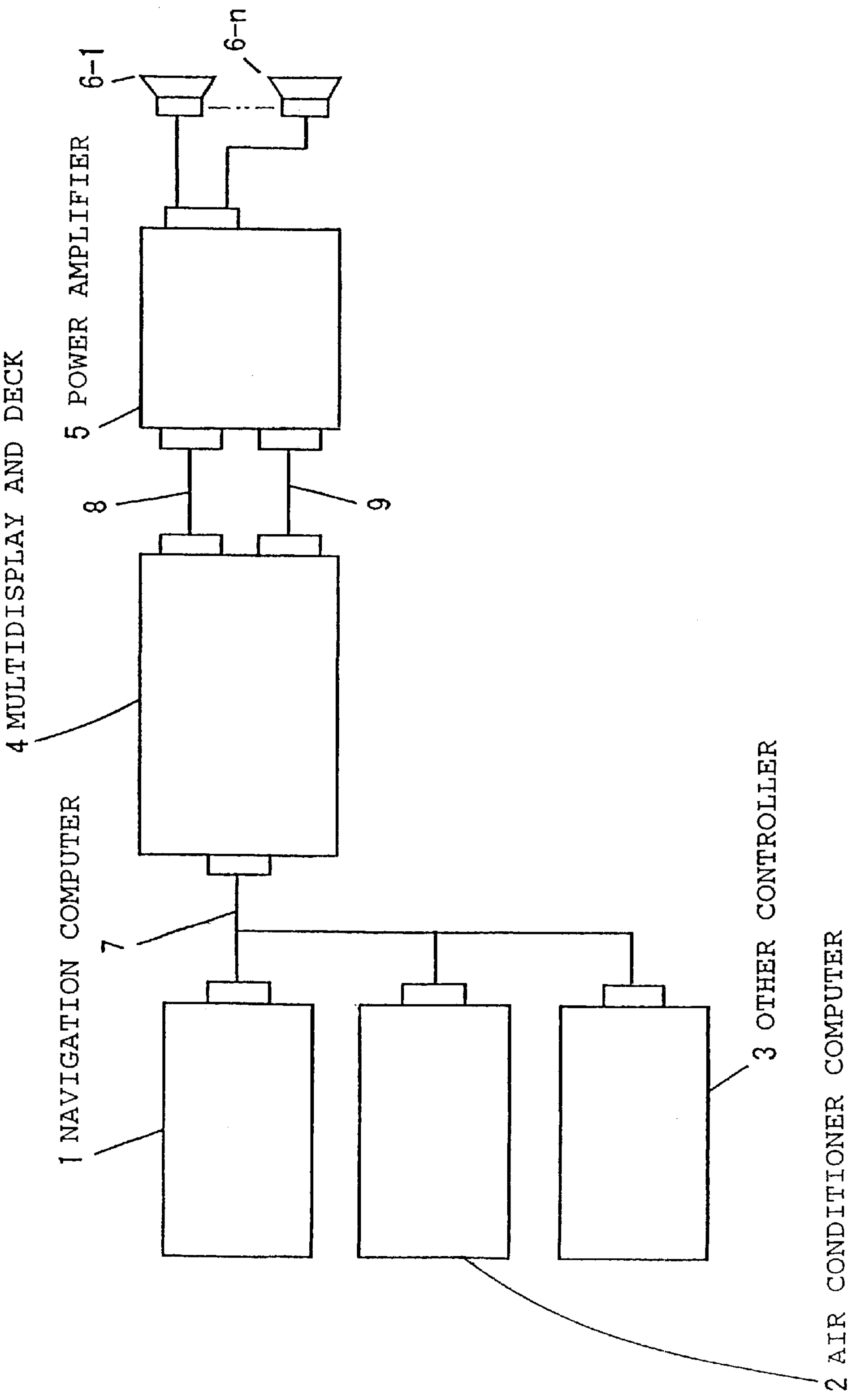
FIG. 1 is a schematic block diagram showing the electrical arrangement of an electromultivision.

One embodiment of the present invention will be described with reference to the accompanying drawings. Referring to FIG. 1, a typical electromultivision is schematically shown. Reference numeral 1 designates a navigation computer and reference numeral 2 designates an air conditioner computer. Reference numeral 3 designates a controller for a telephone computer or the like. Reference numeral 4 designates a multidisplay and deck. A room LAN cable 7 is provided for the multidisplay and deck 7 and each of the computers 1 and 2 and controller 3.

On the other hand, an audio harness 8 is used between the multidisplay and deck 4 and a power amplifier 5 for transmission of audio signals and a control harness 9 is used for transmission of control signals. The audio and control harnesses 8 and 9 may or may not be separated. A plurality of loud speakers 6-1 to **6-*n* are connected to the power amplifier 5**.

Figure 2:
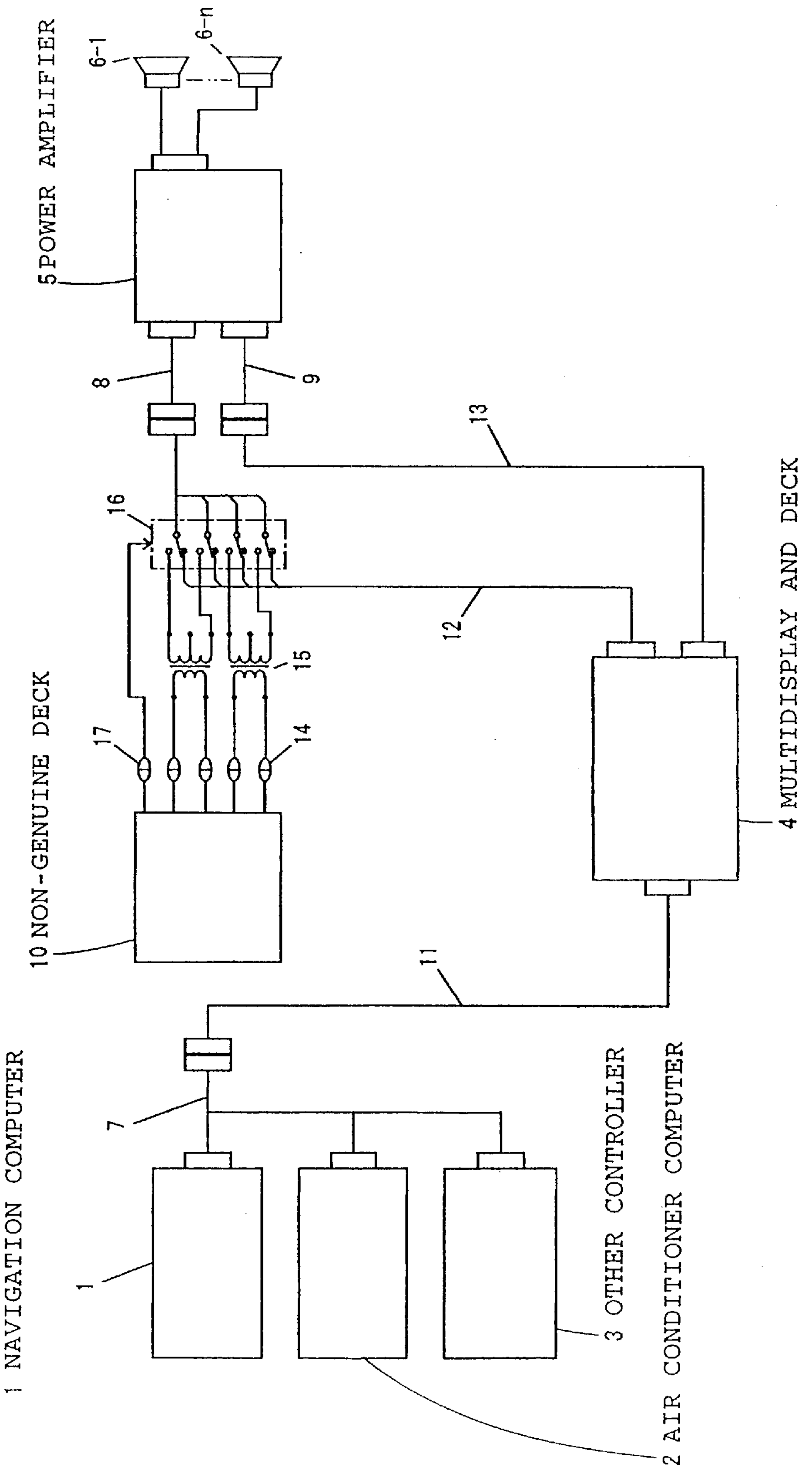
FIG. 2 is a schematic block diagram showing the electrical arrangement of an electromultivision to which the vehicle audio adapter in accordance with the invention is applied.

Referring now to FIG. 2, the electromultivision to which the adapter A of the present invention is applied is shown. Reference numeral 10 designates a commercially available non-genuine deck 10. A LAN extension cable 11 is provided between the LAN cable 7 and the multidisplay and deck 4 for extending the LAN cable. An audio extension cable 12 is provided between the audio harness 8 and the multidisplay and deck 4 for extending the audio harness. A control extension cable 13 is provided between the control harness 9 and the multidisplay and deck 4 for extending the control extension cable.

The adapter A includes switching means 16, such as a relay, connected through the audio harness 12 to the multidisplay and deck 4 and a terminal 17 receiving a remote output delivered from the non-genuine deck 10 controlling the switching means. A terminal 14 receives a speaker output delivered from the non-genuine deck 10. A transformer 15 coverts the speaker output so that the output is suitable for an input to the power amplifier 5. The adapter A switches between the terminal 14 and the transformer 15.

Two channels are usually used for audio signals in the electromultivision system. Accordingly, two sets of the terminals 4 and transformers 15 receiving the speaker output are required, and the switching means 16 is required to cope with four circuits.

The multidisplay and deck 4 is connected through the LAN extension cable 11, audio extension cable 12 and control extension cable 13 such that there is no limitation in the installation location thereof. Consequently, the multidisplay and deck 4 can be moved from the proper console location to a location which does not interfere with the driver. Thus, the commercially available non-genuine deck 10 can be mounted.

Contacts of the switching means 16 assume the position as shown in FIG. 2 when the non-genuine deck 10 is deenergized. An output of the multidisplay and deck 4 is connected to the power amplifier 5. This connecting manner results in no problem since the genuine apparatuses are connected together. When the non-genuine deck 10 is turned on, a remote terminal increases to 12 V such that the contacts are switched to the side not shown. As a result, the converted output of the deck 10 is connected to the power amplifier 5. Only the audio signals are switched, control signals remain connected to the multidisplay and deck 4. Thus, the consistency of the system can be maintained.

According to the above-described embodiment, functions of the room LAN are maintained with the genuine apparatuses being left and the genuine apparatus is replaceable with the non-genuine apparatus when a predetermined one of the apparatuses connected by the LAN cable 7 or the like is replaced with a non-genuine apparatus which cannot be connected by LAN. Thus, the vehicle electromultivision system can be constructed by the non-genuine head unit apparatus with the consistency of the system being maintained. Furthermore, when the non-genuine apparatus can be disposed, with the fitting, at a position from which the apparatus necessary for the room LAN has been moved to another position. A glove box, a space below a seat, a trunk or luggage space may be selected as the position. Fittings are provided for fixing the apparatus at the respective positions. Consequently, the genuine head unit can easily be replaced with the non-genuine head unit or added.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A vehicle audio adapter which is used in a vehicle multivision system in which electronic apparatuses including an audio, television, car navigation, air condition control, picture monitor and switch panel are connected by a LAN cable thereby to be constructed into a room LAN so that the electronic apparatuses are intensively controlled by a single monitor, wherein when a predetermined one of the electronic apparatuses connected by the room LAN cable is replaced with a non-genuine apparatus which cannot be connected by the room LAN cable and is unsuitable for the room LAN, functions of the room LAN are maintained with the genuine apparatus being left and the genuine apparatus is replaceable with the non-genuine apparatus.

2. A vehicle audio adapter according to claim 1, wherein an apparatus necessary for the room LAN is moved from one position to another in the vehicle and which further comprises a fitting for mounting the non-genuine apparatus instead of the moved room LAN.

3. A vehicle audio adapter according to claim 1, wherein the non-genuine apparatus added at another position in the interior of the vehicle can be replaced without moving an apparatus necessary for the room LAN.

4. A vehicle audio adapter according to claim 1, further comprising a signal wire provided for connecting a LAN cable or extension cable required for moving the apparatus necessary for the room LAN.

5. A vehicle audio adapter according to claim 4, wherein a sound signal circuit is connected only when the non-genuine apparatus is turned on, using an external amplifier remote signal changing to 12 V when the non-genuine apparatus is turned on and to 0 V when the non-genuine apparatus is turned off.

6. A vehicle audio adapter according to claim 5, further comprising a double-throw switch with a plurality of poles or relay switch for switching the sound signal circuit between the genuine audio apparatus and a non-genuine audio apparatus.

7. A vehicle audio adapter according to claim 1, wherein another location in the vehicle to which an apparatus required for the room LAN is moved includes an interior of a glove box, a space under a seat, an interior of a trunk, a luggage space and the like, the adapter further comprising fittings for fixing the apparatus at said another location.

8. A vehicle audio adapter according to claim 2, wherein another location in the vehicle to which an apparatus required for the room LAN is moved includes an interior of a glove box, a space under a seat, an interior of a trunk, a luggage space and the like, the adapter further comprising fittings for fixing the apparatus at said another location.

9. A vehicle audio adapter according to claim 3, wherein another location in the vehicle to which an apparatus required for the room LAN is moved includes an interior of a glove box, a space under a seat, an interior of a trunk, a luggage space and the like, the adapter further comprising fittings for fixing the apparatus at said another location.

10. A vehicle audio adapter according to claim 4, wherein another location in the vehicle to which an apparatus required for the room LAN is moved includes an interior of a glove box, a space under a seat, an interior of a trunk, a luggage space and the like, the adapter further comprising fittings for fixing the apparatus at said another location.

11. A vehicle audio adapter according to claim 5, wherein another location in the vehicle to which an apparatus required for the room LAN is moved includes an interior of a glove box, a space under a seat, an interior of a trunk, a luggage space and the like, the adapter further comprising fittings for fixing the apparatus at said another location.

12. A vehicle audio adapter according to claim 6, wherein another location in the vehicle to which an apparatus required for the room LAN is moved includes an interior of a glove box, a space under a seat, an interior of a trunk, a luggage space and the like, the adapter further comprising fittings for fixing the apparatus at said another location.

* * * * *